B. HAUSHEER.
WIRE SHAPING MACHINE.
APPLICATION FILED MAY 14, 1912.
1,090,850.
Patented Mar. 24, 1914.
2 SHEETS—SHEET 2.
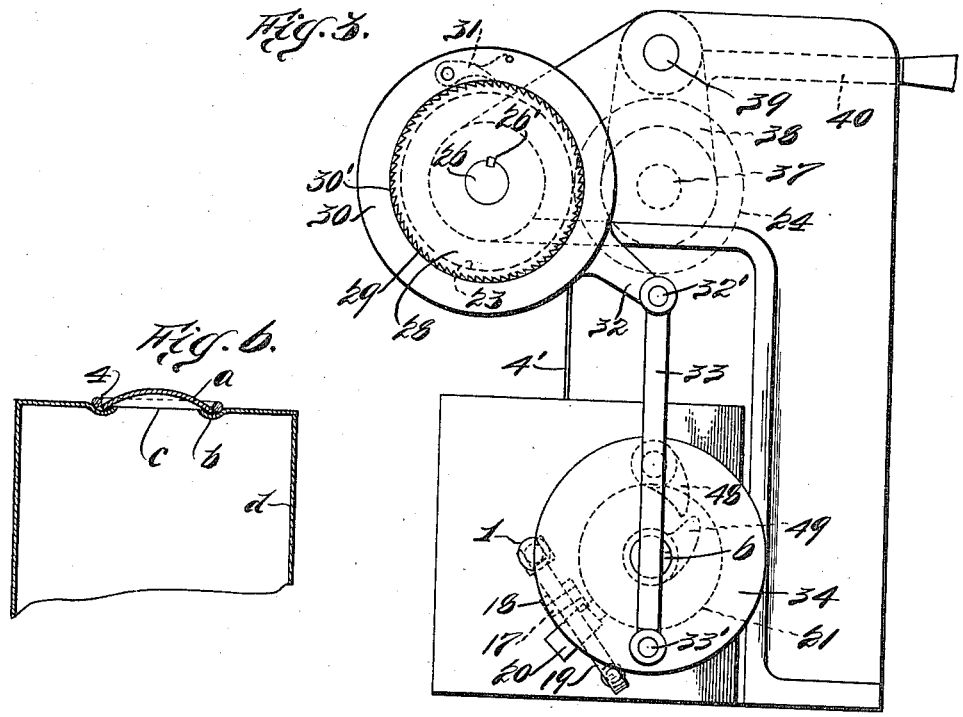
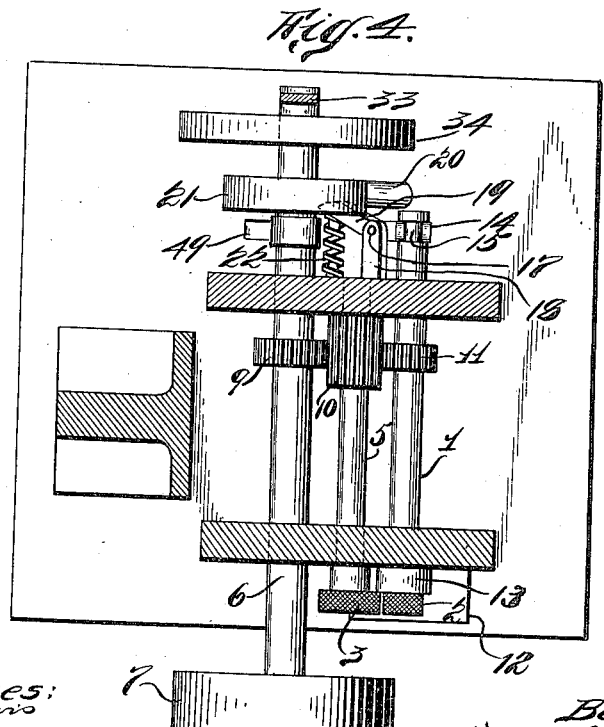
Witnesses:
E. A. Jarvis
George H. Measures.
Inventor:
Bernard Hausheer
Walter D. Edmonds
attorney.

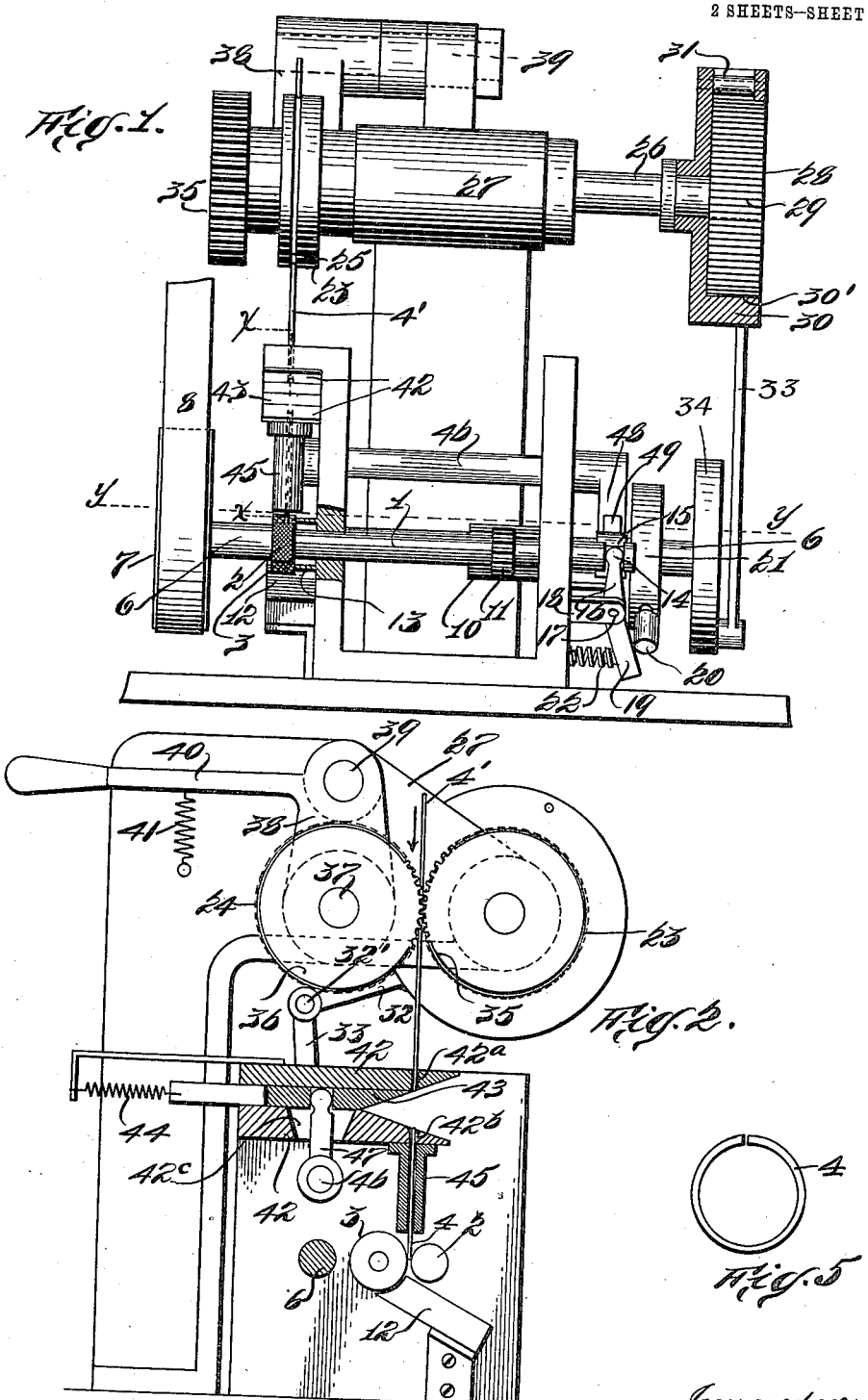

UNITED STATES PATENT OFFICE.

BERNARD HAUSHEER, OF NORWICH, NEW YORK, ASSIGNOR TO BORDEN'S CONDENSED MILK COMPANY, OF NEW YORK, N. Y., A CORPORATION OF NEW JERSEY.

WIRE-SHAPING MACHINE.

1,090,850.   Specification of Letters Patent.   Patented Mar. 24, 1914.

Application filed May 14, 1912.   Serial No. 697,139.

*To all whom it may concern:*

Be it known that I, BERNARD HAUSHEER, a citizen of the United States, and a resident of Norwich, in the county of Chenango and State of New York, have invented a certain new and useful Wire-Shaping Machine, of which the following is a specification.

My invention relates to machines for automatically imparting to strips of metal, such as solder-wire, predetermined uniform circular conformation, *i. e.* ring-like shape. Wire so shaped may be useful for many purposes. It is particularly so in the practice of the method invented by me for saving solder which consists briefly in soldering circular caps to tin cans by preliminarily shaping rings of solder wire to fit the seam and of the gage required to supply just enough solder. These rings I apply upon the circular joint unmolten and then while thus in place heat and iron them, thus making a better seam, and saving about half the solder required by previous methods.

The objects of my present invention comprise the production of a machine which will automatically rapidly, cheaply and exactly impart, to solder wire particularly, ring-like shape and of the size and circularity required for the soldering, and solder saving, purposes mentioned, though my said machine will be, obviously, useful to impart the said shape to any strands of metal for any other purpose.

I attain these objects by the mechanism illustrated in the accompanying drawings, in which—

Figure 1 is a side view in elevation of a machine incorporating my invention; Fig. 2 is an end view of Fig. 1, partly in section, seen from the left side of the latter, the sectional portions being taken on the dotted line *x—x* of Fig. 1; Fig. 3 is an end view in elevation of Fig. 1, seen from the right side of the latter; Fig. 4 is a plan, partly in section, taken on the line *y—y* of Fig. 1; Fig. 5 is a detail view, on enlarged scale, of one of the ring-shaped products of my machine; Fig. 6 is a diagrammatic detail, on the scale of Fig. 5, illustrating the application and utility of one of my said rings composed of solder wire placed as aforesaid, preliminarily to soldering, upon the joint between a cylindrical cap and can, the parts being shown in a central vertical section.

Similar reference characters refer to similar parts throughout the several views.

Referring now to the drawings, 1 is a rotatory shaft slidably journaled in any suitable bearings supported by the frame of the machine.

2 is a circular mandrel having a laterally extended operative periphery of uniform surface, preferably knurled as shown. Said mandrel is carried by the shaft 1 and is of diameter equal to that of the interior of the ring to be produced.

3 is a circular feed disk, likewise of laterally extended operative periphery of uniform surface preferably knurled and disposed to coöperate with said mandrel by bearing against the wire 4 when it is interposed between them. The disk 3 is carried by a rotatory shaft 5 suitably journaled in the frame of the machine.

6 is the main-shaft of the machine likewise suitably journaled and rotated and carrying pulley 7 rotated by belt 8 from a source of power not shown. Rotation toward each other downwardly in opposite directions is imparted from the main-shaft to the mandrel 2 and the disk 3 by gear 9 carried by said main-shaft which meshes with gear 10 carried by the shaft 5 which meshes with gear 11 carried by the mandrel-shaft 1. It follows from this construction that a length of wire 4 fed, as shown in Fig. 2, downwardly to interpose between knurled mandrel 2 and disk 3 will be fed downward by and between them, the disk or member 3 meanwhile bearing on the wire in a substantially horizontal plane or direction opposed to the pressure or bite of the mandrel thereon.

Adjacent the mandrel 2 is secured to a stationary part of the frame of the machine a wire-shaping stationary member, or block 12 having a laterally extended inclined-plane operative surface disposed as shown to engage the wire and bearing thereon in directions different from the disk 3 when the wire is advanced thereto from intermediate said disk and the mandrel. The said member 12 is so shaped as aforesaid and located as to impart to the wire forced against it by the disk and mandrel, curvature corresponding with that of the periphery of the mandrel. It follows that the wire being of consistency required to insure retention of the shape thus locally imparted must, as fed, finally attain, throughout its extent, the form of a complete circle the interior diameter of which is equal to the external diameter of the mandrel, also that proper bending of each length of wire is by this construction assured, though such lengths be introduced to the bending elements at somewhat variant points.

By means hereinafter described the wire is supplied to the mandrel in the lengths required to form thereon a substantially complete, though disconnected, ring such as shown in Fig. 5. The requisite length of wire having been shaped as aforesaid to constitute the ring is, at the end of that operation, left on and encircling the mandrel. I provide means to remove the ring from the mandrel as follows:—Carried by a stationary part of the machine adjacently to the normal position of the mandrel is a stationary member 13, preferably cylindrical, concentric with the shaft 1 and of dimensions sufficient to receive the mandrel without the thereon ring of wire. I impart horizontal oscillation to said shaft whereby the mandrel intermittently enters the cylindrical member 13 which thus pushes the ring off the mandrel. The, as aforesaid, slidably mounted shaft 1 rotates within a fork 14 engaging with a circumferential groove 15 in said shaft (Figs. 1 and 4). Said fork is carried by one of the arms 16 of a vibratable lever pivoted on the pin 17 carried by the arm 18 carried by a stationary part of the machine. The other arm 19 of said lever is shaped and disposed to extend, when the mandrel 2 is in normal operative position, into the path of an arm 20 carried by a disk 21 carried by the main shaft 6. The arm 19, and thus the mandrel, are maintained in their said normal position by stress of a spring 22 (Fig. 1) which bears against said arm from a stationary part of the machine whereby said spring is carried. The construction is such that its operation is timed to draw the mandrel within the cylindrical member 13 immediately on completion of each ring and then return it to its normal operative position before the next length of wire is supplied thereto as hereinafter described. It will be noted that the aforesaid disposition of the axis of the mandrel in a horizontal plane is essential to successful removal of the ring by the means described.

I provide, as follows, means to intermittently supply the mandrel with the lengths of wire required to form each ring. The uncut wire 4' is derived in a continuous strip from any convenient source of supply as for example the usual commercial reel (not shown). Thence it passes between the intermittently feeding and supporting rotatory disks 23 and 24. The disk 23 is provided with a peripheral annular groove 25 within which the wire is partially contained to assist in its required alinement. The disk 23 is carried by a shaft 26 rotatably mounted in a stationary part of the machine, towit, the head 27. The shaft 26 carries, secured thereto by a key 26', (Fig. 3) a disk 28 the periphery of which is provided with ratchets 29. The shaft 26 also loosely carries a thereon rotatable disk 30 having a concentric recess 30' within which is disposed the ratcheted disk 28. A pawl 31 disposed to engage with said ratchets is carried by the disk 30 which also carries an arm 32, (Fig. 3) pivotally connected as at 32' with one end of a link 33, the opposite end of which is pivotally connected as at 33' with a disk 34 carried by the main shaft 6.

It follows that as the main shaft is rotated intermittent rotation is imparted to the shaft 26 and the thereby carried feed disk 23. The shaft 26 carries at its opposite end a gear 35 which normally intermeshes with a gear 36 carried by a pin 37 rotatably mounted in the lower end of a movable depending bracket 38 vibratably carried on the pivot 39 secured to a stationary part, towit, the head 27. The pin 37 also carries the aforesaid feed disk 24 (Fig. 2) which is a duplicate of the disk 23 and is normally disposed so that its peripheral annular groove (not shown), corresponding with the said groove 25 in the disk 23, registers with the latter to control and feed the wire between them. The movable bracket 38 carries a handle 40 (Fig. 2) connected with one end of a retractile spring 41 the other end of which is secured to a stationary part of the machine. It follows from the construction described that the disk 24 is rotated in opposite direction simultaneously and equally with the disk 23 being meanwhile normally forced against latter by yielding pressure imparted by the spring 41, which also yields to enable the disk 24 to be separated from the disk 23 by raising the handle 40 when required for any purpose as for example to interrupt the feed, or insert, or adjust, the wire, etc. Equal lengths of the wire guided by and borne upon by the grooves of the disks will thus be fed downward intermittently toward the cutting means which I provide as follows:—A bracket 42 in two parts carried by a stationary part of the machine contains a passage within which is guided and slidably supported a knife 43. The free end of said bracket is bifurcated as shown (Fig. 2) and the bifurcations contain vertical bores 42$^a$ 42$^b$ registering with each other and with the aperture of the aforesaid grooves of the feed disks, and adapted to receive, support, and guide the wire through said bracket on its way to the mandrel 2.

Integral with, or secured to, and dependent from, the lower bifurcation of the bracket 42 is a longitudinally extended guide member 45 having a vertically disposed bore of caliber such as to admit passage of a cut length of wire impelled therethrough by gravity and guide the same to required location of contact with the mandrel 2 and rotatory head 3.

The knife is held normally retracted out of the path of the wire by the spring 44 secured to the knife and to a stationary part. I provide means to advance the knife to sever the wire, at the proper moment, as follows:—An oscillating shaft 46 suitably journaled in convenient portions of the frame of the machine carries at one end an arm 47 disposed to extend through a suitable opening 42$^c$ in the bracket 42 to engage the knife 43 (Fig. 2). The opposite end of the shaft 46 carries an arm 48 disposed to project in the path of a cam 49 carried by the main shaft. Thus each rotation of the main shaft advances the knife once to sever the wire and owing to the combination of other elements described cuts off a length of wire needed to produce one of the desired rings, i. e. a length equal to the working peripheries of the mandrel.

The proportions and relative dispositions of the aforesaid respective elements are such as to time their action on the wire and severed lengths thereof as follows:—The feeding disks 23 and 24 are intermittently rotated to feed the wire to a position in which the free end thereof depends below the knife edge the length required to constitute the aforesaid ring. At this stage the rotation of the disks 23 and 24 ceases. The knife is then caused to advance thereby severing the wire, the severed portion drops vertically by gravity to be engaged by the constantly rotating mandrel 2 and disk 3 by which and the block 12 it is shaped as aforesaid. In Fig. 2 is shown a severed length of wire 4 which having thus been delivered is in process of being bent into ring shape, the remaining uncut strand of wire being shown at the moment stationary and terminating at the point of severance ready to be fed down another length at the next partial rotation of the disks 23 and 24.

An important result of my construction is that the wire travels in a straight downward line from its point of delivery by the feed disks 23, 24, to its point of seizure by the mandrel 2 and head 3; also that the wire is severed while held in said line; also that the severed length of wire is delivered by gravity to the mandrel, and also that at the moment of such delivery and thereafter until the ring is nearly complete the unbent remainder continues supported and guided in said straight line by the member 45 thus insuring production of the ring on a single plane rectangular to the axis of the mandrel, and also that by reason of the lateral extension and uniform surfaces of the operative peripheries of the mandrel and disk 3 they are enabled to seize and effectively forward the lengths of wire to the bending member 12 notwithstanding such lengths are as aforesaid delivered by gravity at somewhat variant points.

As soon as the ring has been, as aforesaid, completed, the mandrel is retracted momentarily within the member 13, which throws off the completed ring, whereupon the mandrel is immediately returned to normal position ready to receive the next length of wire which has been meantime fed down by further rotation of the disks 23 and 24, and severed in time to reach the mandrel on its said return. The resulting operation and output of the machine is thus normally continuous and may be very rapid. It is also automatic, neither the wire nor the machine, requiring, normally, any handling by operatives during its conversion into rings of the entire length of wire contained on any given reel. The ring-shaped portions of solder wire thus produced are notably uniform in circularity and diameter and thus adapted for uses requiring economy and exactness in these respects, as for instance, particularly, to be applied to soldering of correspondingly dimensioned joints between the circumferential edges of circular tin caps such as indicated by $a$ in Fig. 6 and corresponding annular flanges $b$ surrounding the circular openings $c$ of cylindrical tin cans $d$. The cap having been placed in position, over the opening, the ring is placed over the joint as shown in Fig. 6, and, suitable flux being added, is there melted and ironed into place thus producing a tight and uniformly soldered seam with much less expenditure of solder than by any other soldering method with which I am acquainted.

What I claim as new and desire to secure by Letters Patent is the following, viz:—

1. In a wire-shaping machine, means to feed the wire; means to movably support and guide the wire in a straight downwardly projected line while so fed; means to intercept said feed; means to transversely sever a length from said wire while said feed is intercepted; means to guide, in said line, said severed length while falling; beneath said last mentioned means a rotary mandrel and a therewith co-acting oppositely rotating disk disposed to receive between them the downwardly presented end of said length when it falls; and, adjacent said mandrel, a member disposed to thereafter bend said length in conformity with the periphery of said mandrel.

2. A wire-shaping machine comprising a rotatory cylindrical mandrel having its axis of rotation disposed in a horizontal plane, means to rotate said mandrel, means to vertically feed a length of wire equal to the periphery of said mandrel to contact therewith in said plane, a feed disk disposed to direct said wire toward said axis in said plane, below said plane a member disposed to direct said wire toward said axis, and means to horizontally reciprocate said mandrel after a rotation thereof, substantially as and for the purposes described.

3. In a wire-shaping machine, means to downwardly feed the wire in a straight line; means to movably support the wire in said line; means to transversely sever a length from said wire so supported; means to guide in said line said severed length while falling; beneath said last mentioned means a rotatory mandrel and a therewith co-acting oppositely rotating disk disposed to receive between them and downwardly presented end of said length when it falls; and, adjacent said mandrel, a member disposed to thereafter bend said length in conformity with the periphery of said mandrel.

4. A wire-shaping machine comprising a rotatory cylindrical mandrel having its axis of rotation disposed in a horizontal plane, means to vertically feed a length of wire equal to the periphery of said mandrel to contact therewith in said plane, a rotatory feed disk disposed to direct in said plane said wire toward said axis, means to rotate said member and said mandrel in opposite directions, below said plane a member disposed to direct said wire toward said axis, and means to horizontally reciprocate said mandrel after a rotation thereof, substantially as and for the purposes described.

5. A wire-shaping machine comprising a rotatory mandrel of circular periphery having its axis of rotation in a horizontal plane, disposed to grip the wire with said mandrel a rotatory feed disk of circular periphery having its axis of rotation parallel with said mandrel's in said plane, means to rotate said peripheries in opposite directions, above said plane a member containing a vertical bore dimensioned and directed to guide therethrough, to said peripheries, a gravity-impelled length of wire equal to the periphery of said mandrel, and, below said plane, a member disposed to direct said wire toward said mandrel.

6. A wire-shaping machine comprising a normally constantly rotating main drive shaft, a rotatory mandrel of circular working periphery having its axis of rotation in a horizontal plane; a rotatory cylindrical feed disk of circular working periphery having its axis of rotation parallel with said mandrel's in said plane, the said peripheries being disposed to coact with each other on the wire; operatively connected with said main-shaft means to continuously rotate said peripheries in opposite directions; below said plane a stationary member disposed to direct the wire toward said axis of said mandrel; above said plane a member containing a vertical bore dimensioned and directed to guide therethrough to said peripheries a gravity-impelled vertically extended length of wire equal to the periphery of said mandrel; above said last-mentioned member, operatively connected with said main shaft, means dimensioned and disposed to feed wire intermittently vertically, downward to insertion of said bore; means operatively connected with said main-shaft to cut off between said bore and said feeding means during intermission of latter said length of wire; and means operatively connected with said main-shaft to horizontally reciprocate said mandrel after a rotation thereof and intermediate each said severance of the wire.

BERNARD HAUSHEER.

Witnesses:
DAVID F. LEE,
MARY G. LOFTUS.

Copies of this patent may be obtained for five cents each, by addressing the "Commissioner of Patents, Washington, D. C."